United States Patent [19]

Azzam

[11] Patent Number: 5,796,098
[45] Date of Patent: Aug. 18, 1998

[54] SENSOR FOR ROTATIONAL VELOCITY AND ROTATIONAL ACCELERATION

[75] Inventor: Rasheed M. A. Azzam, Metairie, La.

[73] Assignee: Board of Supervisors of Louisiana State University and Agricultural and Mechanical College, Baton Rouge, La.

[21] Appl. No.: 717,548

[22] Filed: Sep. 20, 1996

[51] Int. Cl.$^6$ .................................................. G01D 5/34
[52] U.S. Cl. ................ 250/231.13; 250/225; 250/214.1; 356/28; 324/166
[58] Field of Search ................... 250/231.13, 231.18, 250/231.17, 231.14, 225, 214.1; 356/28, 29, 368, 369, 373; 324/166, 175

[56] References Cited

U.S. PATENT DOCUMENTS 5,059,901  10/1991  Van Voorhis .................. 250/231.13

OTHER PUBLICATIONS

R.M.A. Azzam, "Limaçon of Pascal locus of the complex refractive indices of interfaces with maximally flat reflectance-versus-angle curves for incident unpolarized light," J. Opt. Soc. Am. A, vol. 9, pp. 957–963, Jan. 1992.
R.M.A. Azzam et al., "Single-layer-coated surfaces with linearized reflectance versus angle of incidence: application to passive and active silicon rotation sensors," J. Opt. Soc. Am. A, vol. 12, pp. 1790–1796, Mar. 1995.

R.M.A. Azzam, "Stationary property of normal-incidence reflection from isotropic surfaces," J. Opt. Soc. Am., vol. 72, pp. 1187–1189, Sep. 1982.

H.B. Holl, "Specular Reflection and Characteristics of Reflected Light," J. Opt. Soc. Am., vol. 57, pp. 683–690, Jan. 1967.

R.M.A. Azzam, "Angle-of-incidence derivatives of the complex parallel and perpendicular reflection coefficients and their ratio for a film-substrate system," Optica Acta, vol. 30, pp. 1113–1124, Jan. 1983.

*Primary Examiner*—Que Le
*Attorney, Agent, or Firm*—John H. Runnels

[57] ABSTRACT

Novel rotation sensors are disclosed, sensors with a temporal resolution of one measurement per rotation. A transparent or absorbing substrate can be coated with a transparent thin film to produce a linear response in reflectance versus angle of incidence over a certain range of angles. The best results were obtained when the incident light was s-polarized. For example, a Si substrate coated with an $SiO_2$ film was used in constructing a reflection rotation sensor. Experimental results and an error analysis of this rotation sensor are presented.

21 Claims, 17 Drawing Sheets

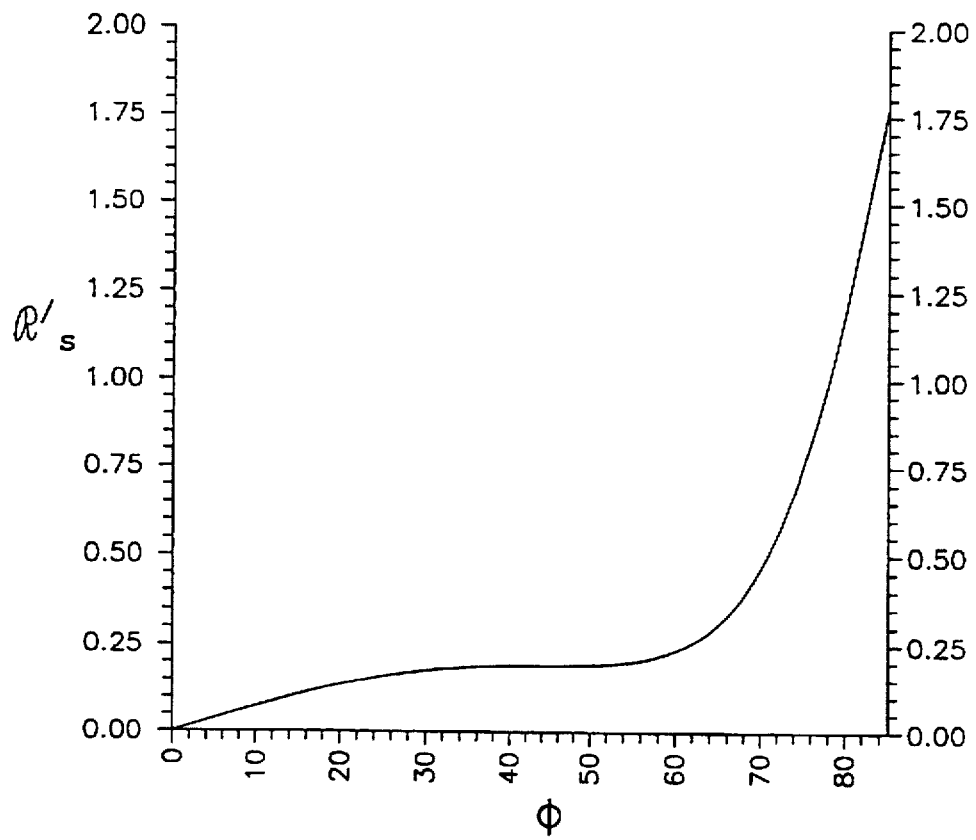
FIG. 3-A

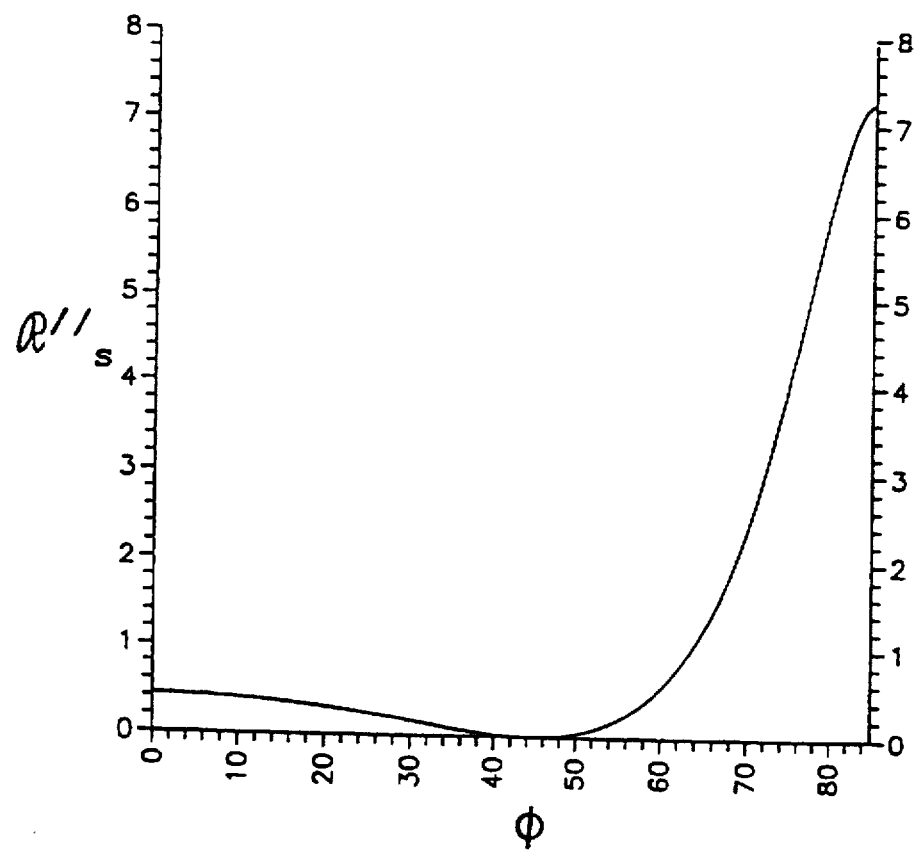
FIG. 3-B

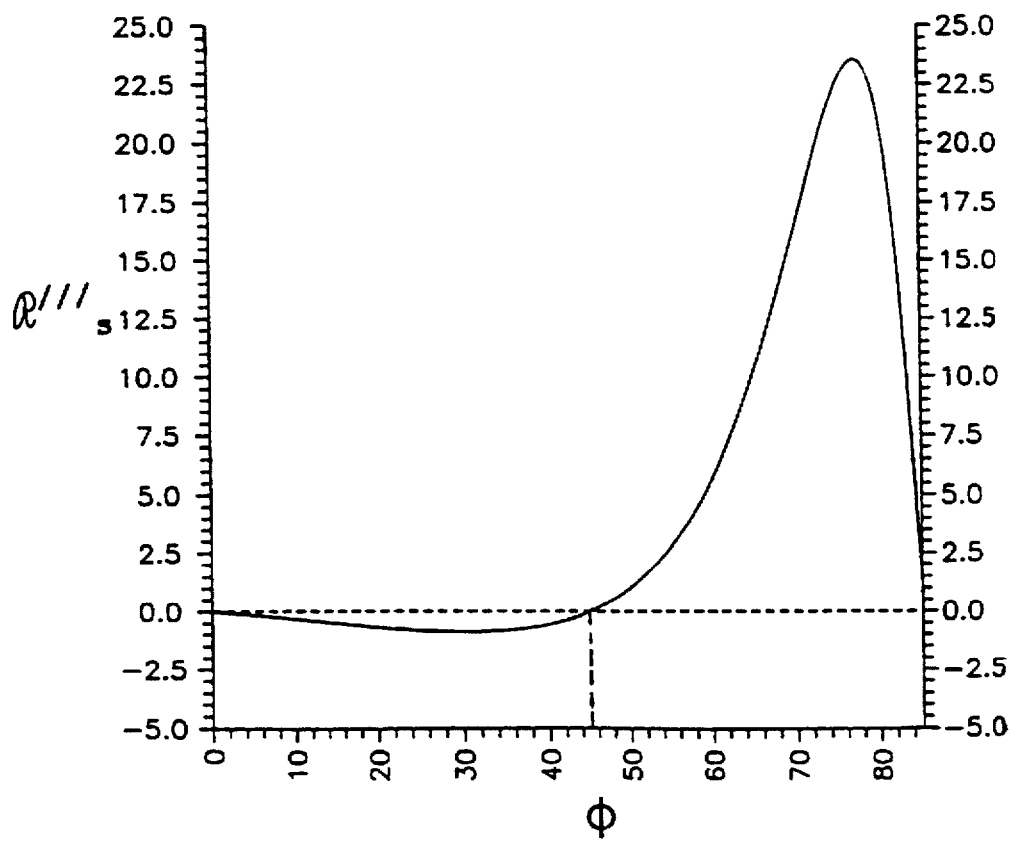
FIG. 3-C

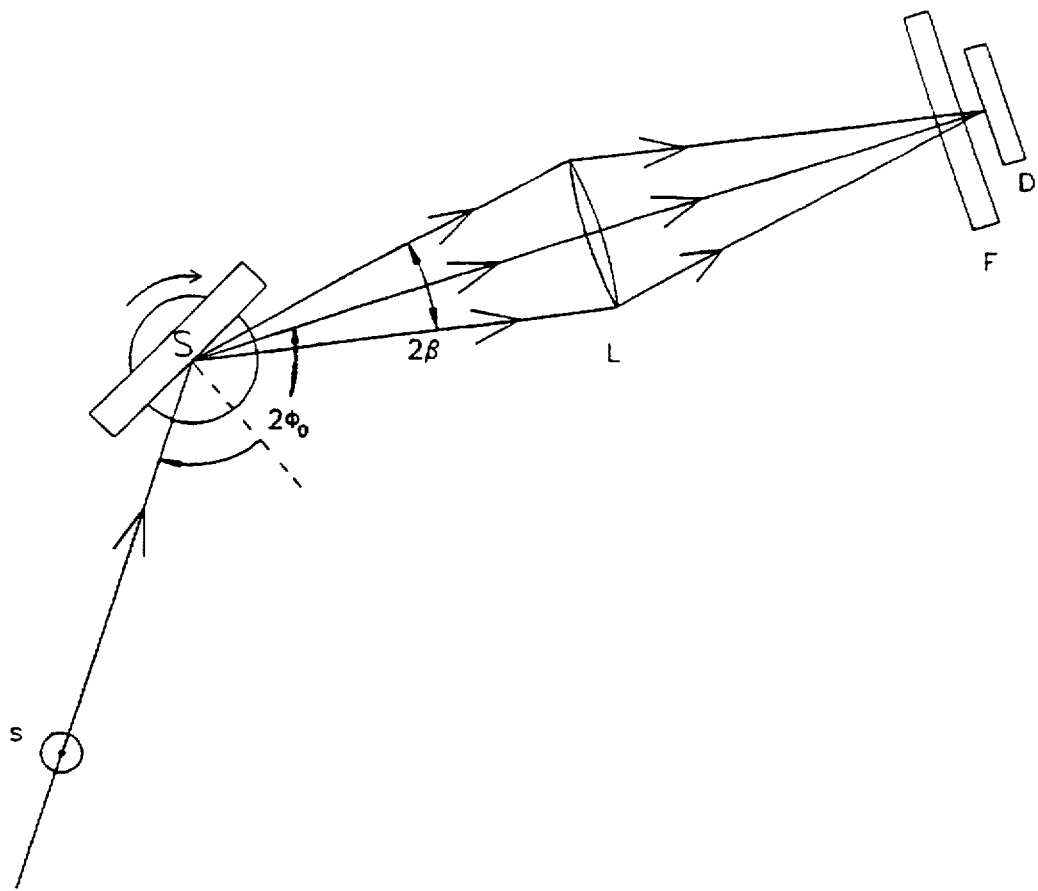
FIG. 11-A

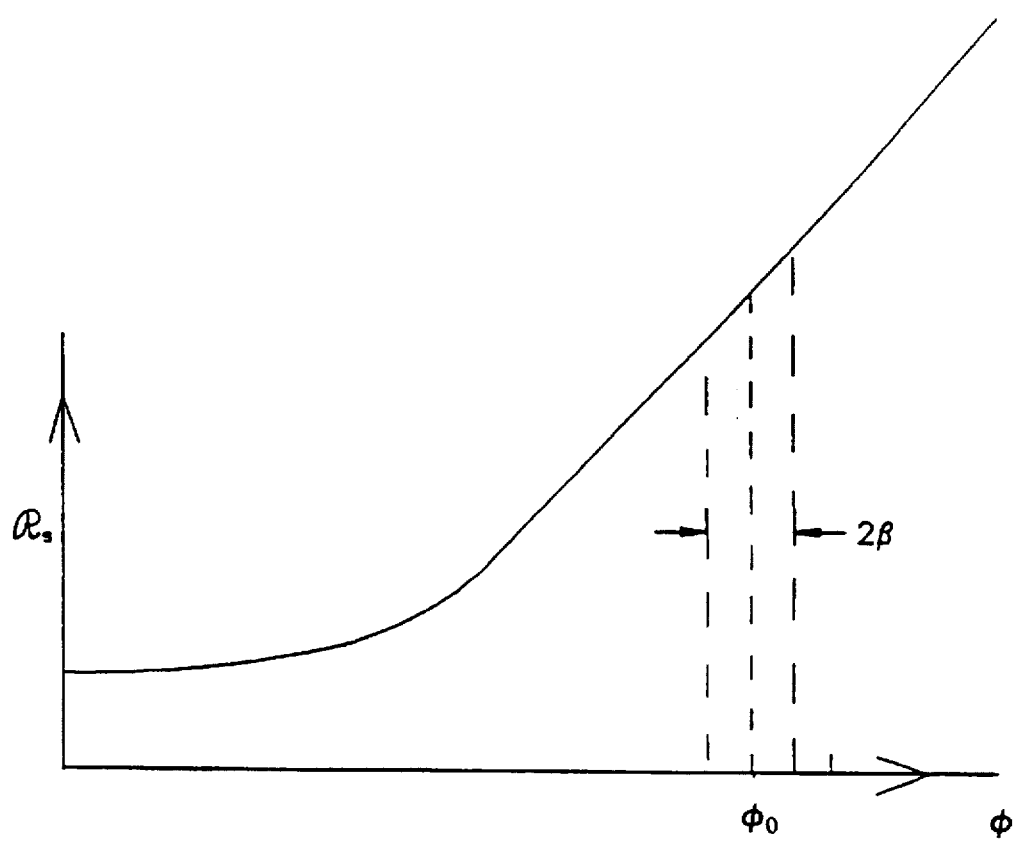
FIG. 11-B ated light reflection in air by the plane surface of a bare Si substrate with $N_2=3.85-j\ 0.02$ at 633-nm wavelength. The
SENSOR FOR ROTATIONAL VELOCITY AND ROTATIONAL ACCELERATION The benefit of the Sep. 29, 1995 filing date or provisional application 60/031,293 is claimed under 35 U.S.C. §119(e).

This invention pertains to a sensor for measuring rotational velocity and rotational acceleration, particularly to a sensor that measures rotational velocity and rotational acceleration by measuring the reflectance of light incident on a coated surface mounted on a rotating object, and to coatings that are useful in such sensors.

There are commercially-available tachometers that sense the passage of barcode patterns to measure rotational velocity, and some that use pulse-counting techniques. Such tachometers are relatively inexpensive, but do not achieve high accuracy.

More accurate rotation measurements have been performed by measurements of the Sagnac effect, using laser resonators or fiber optic gyroscopes. Such devices tend to be costly.

R. M. A. Azzam, "Limacon of Pascal locus of the complex refractive indices of interfaces with maximally flat reflectance-versus-angle curves for incident unpolarized light," J. Opt. Soc. Am. A, vol. 9, pp. 957–963 (1992) discloses conditions under which the reflectance of an uncoated surface can be made unvarying as a function of angle of incidence over a range of angles of incidence.

H. B. Holl, "Specular Reflection and Characteristics of Reflected Light," J. Opt. Soc. Am., vol. 57, pp. 683–690 (1967) presents extensive documentation on the specular reflection properties of uncoated substrates as a function of their complex refractive indices.

There is a continuing need for relatively less expensive devices that can accurately and rapidly measure rotational velocities and rotational acceleration.

Novel optical coatings have been discovered that exhibit linear reflectance as a function of the angle of incident light. Such coatings are useful in the manufacture of novel sensors that can be manufactured relatively inexpensively, and that can accurately measure rotational velocities and rotational accelerations at a temporal resolution of one measurement per rotation.

A transparent or absorbing substrate, such as a semiconductor or metal, is coated with a transparent thin film. By selecting a proper combination of the refractive index of the thin film, the thickness of the thin film, and the wavelength of the incident radiation, the reflection of incident p-polarized, s-polarized, or unpolarized light can be made to be a linear function of the angle of incidence $\phi$ over a meaningful range of angles. The linearity of response allows the use of such a coated surface in a novel rotation sensor that can accurately measure rotational velocities and rotational accelerations at a temporal resolution of one measurement per rotation.

BRIEF DESCRIPTION OF THE DRAWINGS

FIGS. 3(a), 3(b), and 3(c) depict the first derivative $\mathfrak{R}_s'$, the second derivative $\mathfrak{R}_s''$, and the third derivative $\mathfrak{R}_s'''$, respectively for the linearized reflectance response shown in FIG. 2.

FIG. 11(a) depicts a prototype rotation sensor in accordance with the present invention. FIG. 11(b) depicts the reflectance response for the coated surface used in this prototype.

DETAILED DESCRIPTION OF THE DRAWINGS

Conditions for linearity of reflectance versus incident angle

Figure 1:
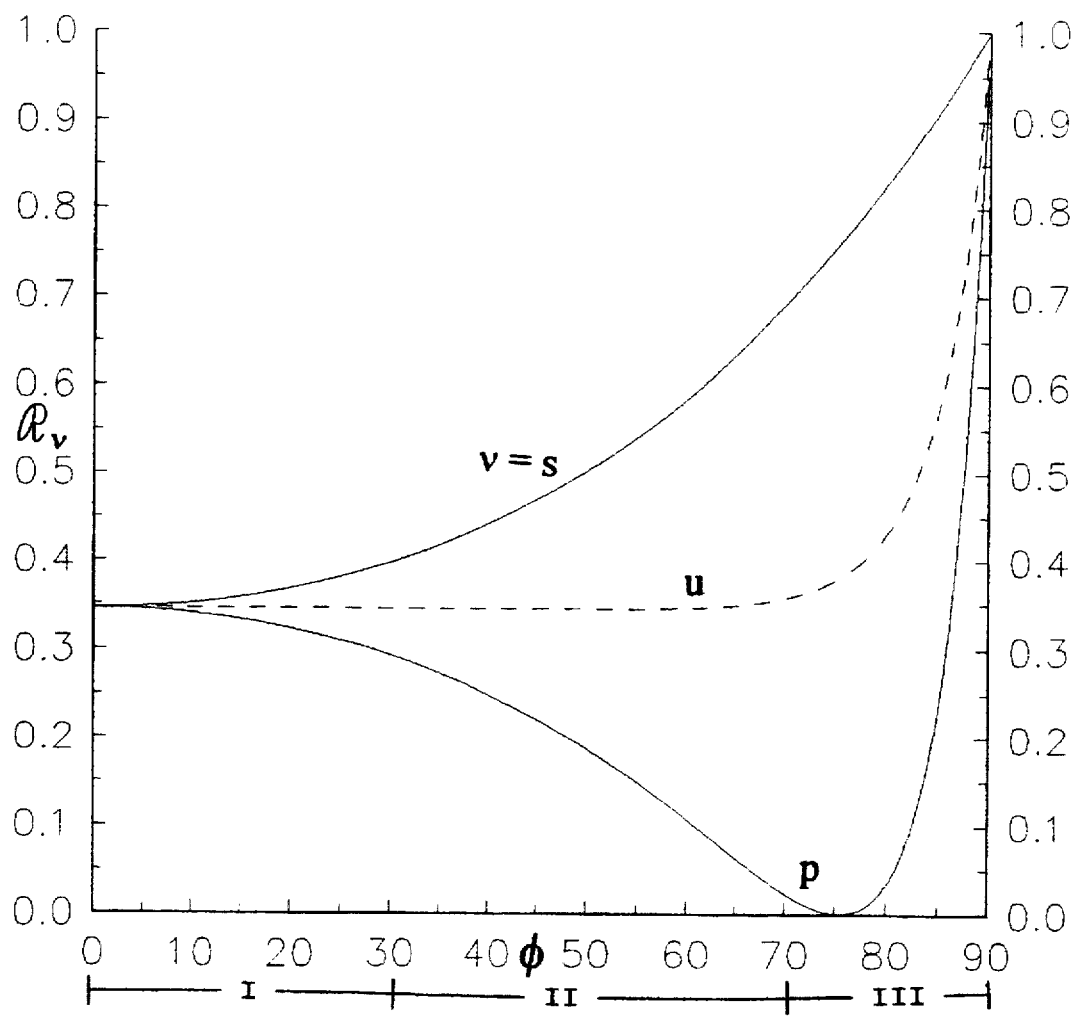
FIG. 1 depicts $\mathfrak{R}$ versus $\phi$ for p-polarized, s-polarized, and unpolarized light reflection in air by the plane surface of a bare Si substrate at 633-nm wavelength.

Consider the reflectance $\mathfrak{R}$ as a function of $\phi$ for an uncoated, optically isotropic substrate with complex refractive index $N_2=n_2-j\ k_2$. As an example, FIG. 1 shows $\mathfrak{R}$ versus $\phi$ for p-polarized, s-polarized, and unpolarized light reflection in air by the plane surface of a bare Si substrate with $N_2=3.85-j\ 0.02$ at 633-nm wavelength. The reflectance $\mathfrak{R}_s$ for s-polarized light increases monotonically with $\phi$ between normal ($\phi=0$) and grazing ($\phi=90°$) incidence, whereas $\mathfrak{R}_p$ experiences a minimum at the pseudo-Brewster angle. The average reflectance $\mathfrak{R}_u$ for incident unpolarized light, shown by the dashed line, experiences a shallow minimum at an oblique incidence angle.

The substrate is to be coated with a transparent thin film of refractive index $n_1$ and thickness d such that $\mathfrak{R}$ is a linear (or approximately linear) function of $\phi$ over a certain range. It is convenient to divide the full range of $\phi$ into three ranges: an initial range I near normal incidence ($0 \leq \phi < 30°$), a midrange II ($30° < \phi < 70°$), and a high range III ($70° < \phi < 90°$). (See FIG. 1)

Linearization in range I leads to a maximally flat response at and near normal incidence. Because a flat response is not useful in a rotation sensor, a flat response in range I will not be discussed further here.

Linearization in ranges II and III is based on writing a Taylor-series expansion of $\mathcal{R}(\phi)$ around a certain operating (or bias) angle of incidence $\phi_0$, in which $\mathcal{R}^{(n)}$ denotes the nth derivative of $\mathcal{R}$ with respect to $\phi$:

$$\mathcal{R}(\phi) = \mathcal{R}(\phi_0) + (\phi - \phi_0)\mathcal{R}^{(1)}(\phi_0) + (\phi - \phi_0)^2/2! \mathcal{R}^{(2)}(\phi_0) + (\phi - \phi_0)^3/3! \mathcal{R}^{(3)}(\phi_0) + \quad (1)$$

and requiring that $$\mathcal{R}^{(2)}(\phi_0) = \mathcal{R}^{(3)}(\phi_0) = 0. \quad (2)$$

The function of the transparent-layer coating is to force the conditions represented by Eqs. (2) to be satisfied. Several specific examples are given below. The analytical details of finding the derivatives of equations (2) are discussed in a later section of this specification.

Examples of coatings with linear reflectance

Examples of coatings that achieve linearity in ranges II and III by satisfying Eqs. (2) are described below for various substrates, including Si, Al, ZnS, and $SiO_2$ (glass), at the convenient 633 nm wavelength (that of a helium-neon laser). For each example considered, solutions were readily obtained for incident s-polarized light. Specific solutions for p-polarization have not yet been found. Solutions were found in some cases for unpolarized light.

Equations (2) are simultaneous nonlinear equations that may be solved by numerical iteration. For example, one may assign a value to $\phi_0$, and then solve Eqs. (2) for the film refractive index $n_1$ and thickness d. Alternatively, one can assign a value to $n_1$ and solve Eqs. (2) for $\phi_0$ and d.

Figure 2:
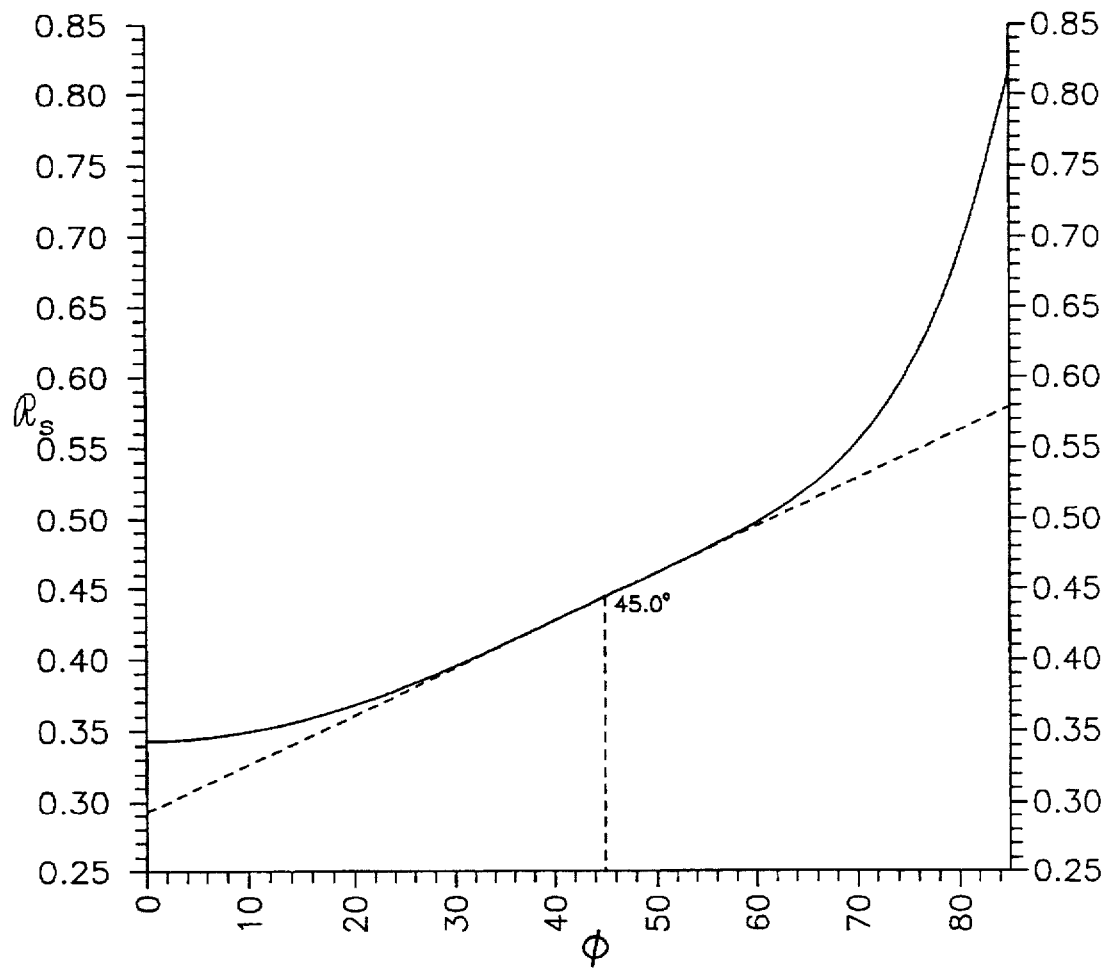
FIG. 2 depicts the linearized reflectance $\mathfrak{R}_s$ of Si for incident s-polarized light of 633-nm wavelength around the angle $\phi_0=45°$ using a dense $MgF_2$ film of refractive index 1.394 and thickness 235.2 nm.

One example of linearization in range II will be given for a Si substrate, incident s-polarized light of 633-nm wavelength, and the convenient operating angle of incidence $\phi_0 = 45°$. Solving Eqs. (2) for the parameters of the transparent film gives $n_1 = 1.394$ (which corresponds to the index of refraction for dense $MgF_2$) and d=235.2 nm. FIG. 2 shows the resulting linearized $\mathcal{R}_s$-versus-$\phi$ curve around $\phi_0 = 45°$, at which $\mathcal{R}_s = 44.43\%$ and the slope of the linear response= 0.366% $deg^{-1}$. FIGS. 3(a), 3(b), and 3(c) show the first, second, and third derivatives $\mathcal{R}_s'$, $\mathcal{R}_s''$, and $\mathcal{R}_s'''$, respectively, of $\mathcal{R}_s$ with respect to $\phi$ for this coated-Si surface. Notice in particular the plateau of zero slope of $\mathcal{R}_s'$ in FIG. 3(a) and the zeroes of $\mathcal{R}_s''$ and $\mathcal{R}_s'''$ at $\phi_0 = 45°$ in FIGS. 3(b) and 3(c), as required by Eqs. (2).

Figure 4:
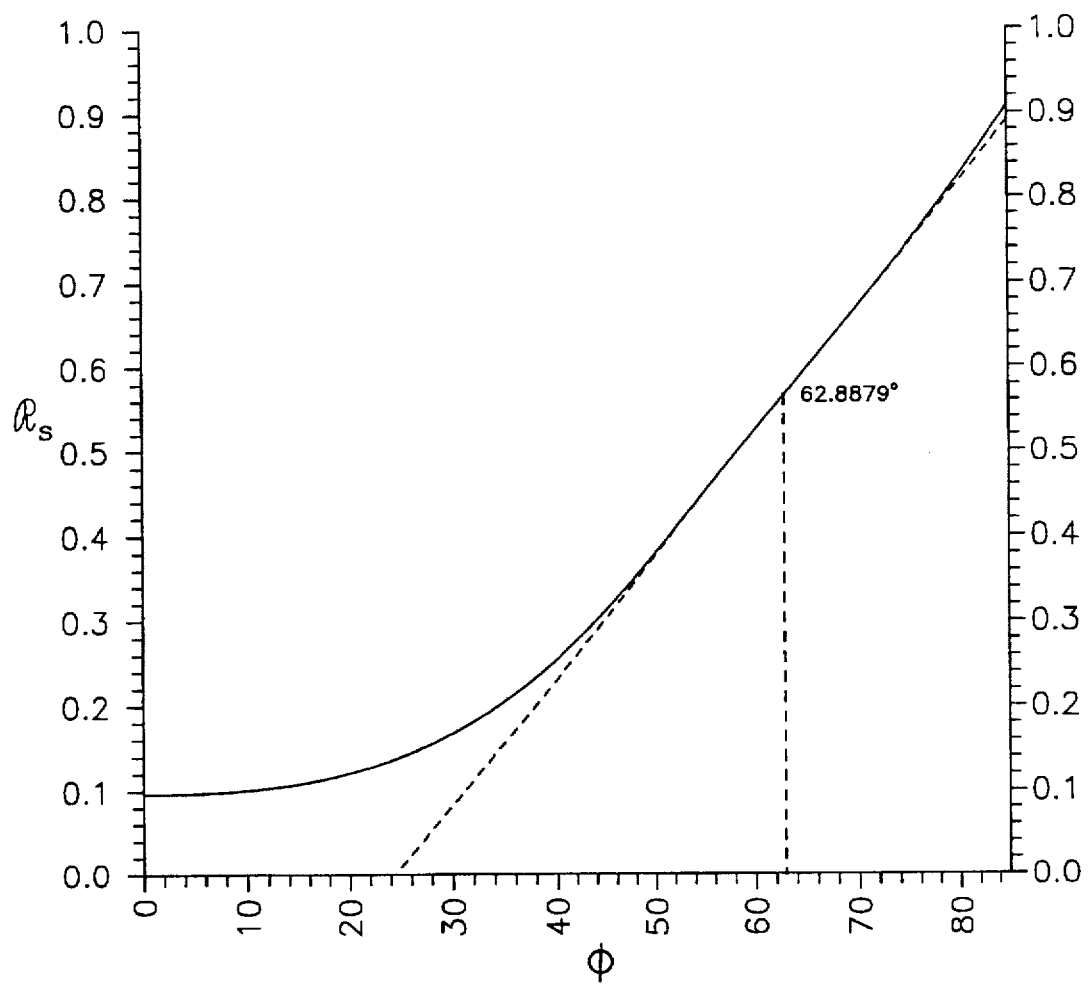
FIG. 4 depicts the linearized reflectance $\mathfrak{R}_s$ of Si for incident s-polarized light of 633-nm wavelength around the angle $\phi_0=62.89°$ using a $SiO_2$ film of refractive index 1.46 and thickness 311.4 nm.

Another example is that of a $SiO_2$ film (refractive index 1.46) on a Si substrate at the same 633-nm wavelength. In this case, Eqs. (2) were solved by operating angle $\phi_0 = 62.888°$ and film thickness d=311.4 nm. The corresponding linearized $\mathcal{R}_s(\phi)$ response, which appears in FIG. 4, has a higher slope of 1.47% $deg^{-1}$ at $\phi_0$.

The "linear range" ("LR") is defined as the range of $\phi$ over which the actual reflectance deviates from its linear approximation (the tangent to the curve at $\phi_0$) by no more than 1%. For the example depicted in FIG. 4, the LR was 55.7°<$\phi$<70.3°. An error analysis for this $SiO_2$-Si design is given below. This $SiO_2$-Si design was used in a prototype optical rotation sensor for measuring the angular speed and acceleration of a rotating shaft, also described below.

As used in the Claims below, the reflectance $\mathcal{R}$ of a coated surface is considered to be a "linear" function of the incident angle $\phi$ for a particular wavelength if the LR as defined above is at least 4° from beginning to end, and if the magnitude of the slope of a graph of $\mathcal{R}$ as a function of $\phi$ is at least 0.10% $deg^{-1}$. (A maximally flat response with zero slope is not considered to be "linear" for these purposes, and would not be useful in a rotation sensor.)

Figure 5:
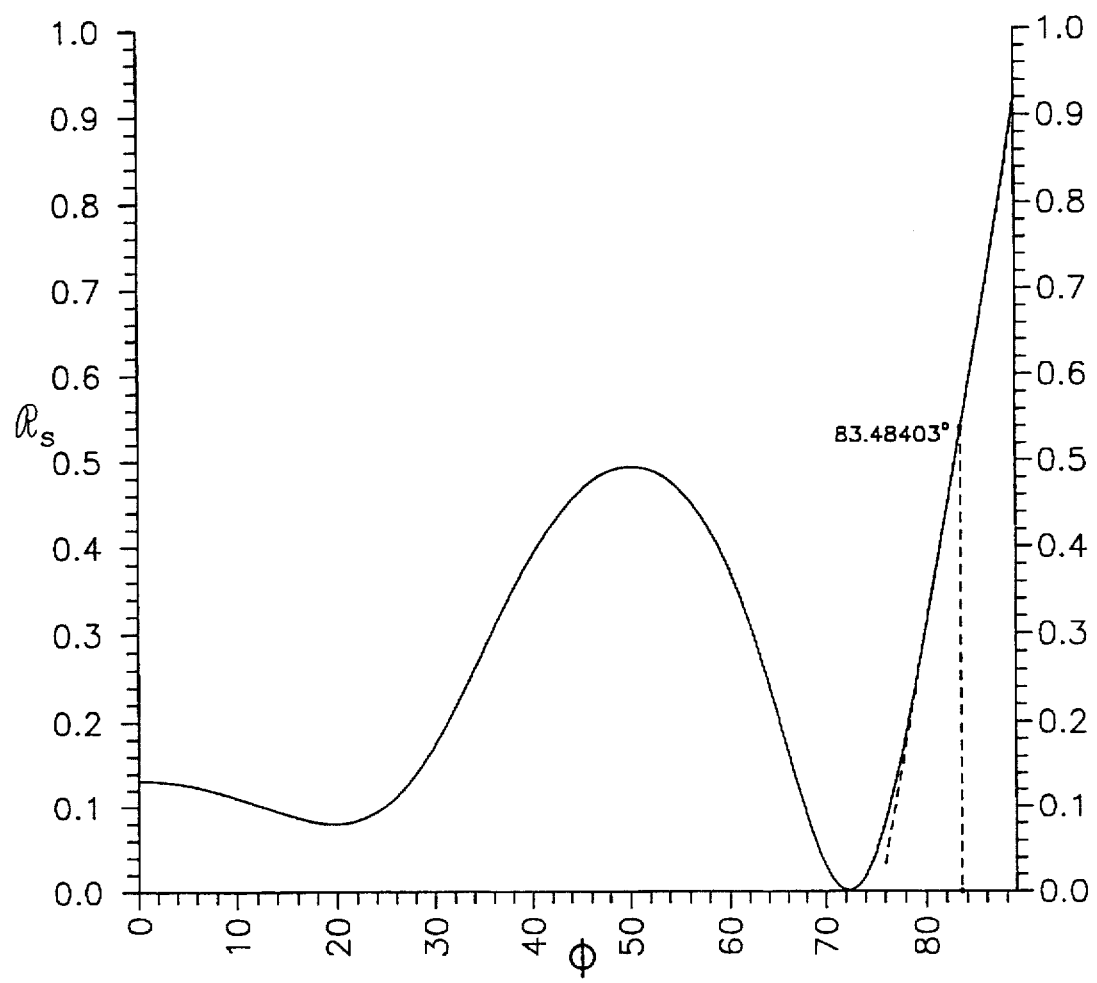
FIG. 5 depicts the linearized reflectance $\mathfrak{R}_s$ of Si for incident s-polarized light of 633-nm wavelength around the angle $\phi_0=83.48°$ using a $SiO_2$ film of refractive index 1.46 and thickness 1002.0 nm.

To obtain a significantly higher slope (which facilitates measurements, at the expense of a reduction in the LR) one has to linearize in range III. One example uses the same general $SiO_2$-Si film-substrate system at the same 633-nm wavelength, but with a higher oxide thickness d=1002.0 nm and a higher operating angle $\phi_0 = 83.484°$. The reflectance curve $\mathcal{R}_s(\phi)$ is depicted in FIG. 5. A linear response occurred at high angles (LR: 81.1°<$\phi$<85.6°), with a slope of 6.75% $deg^{-1}$. It is interesting to note that $\mathcal{R}_s \approx 0$ at 72°, which indicates that this $SiO_2$-Si system can act as a polarizer at that angle.

The above results are summarized in Table 1, which also summarizes other results obtained for linearization of the $\mathcal{R}_s$-versus-$\phi$ curve using Al, polycrystalline ZnS (Cleartran™), and $SiO_2$ (glass) substrates at the same 633-nm wavelength. In Table 1, the wavelength of incident monochromatic light is taken to be 633 nm; $N_s$ is the refractive index of the substrate; $n_1$ is the refractive index of the film; $\phi_0$ is the angle of incidence for which the second and third derivatives of $\mathcal{R}$ are zero; d is the film thickness; $\mathcal{R}_{so}$ is the intensity reflectance at the design angle; $\mathcal{R}_{so}'$ is the first derivative of $\mathcal{R}_s$ with respect to $\phi$ at $\phi_0$; and LR is the linear range defined above.

TABLE 1

| Substrate | $N_s$ | $n_1$ | $\phi_o$ (deg) | d (nm) | $\mathcal{R}_{so}$(%) | $\mathcal{R}_{so}'$(%) | LR (deg) |
|---|---|---|---|---|---|---|---|
| Si | 3.85–j0.02 | 1.394 | 45.000 | 235.17 | 44.43 | 0.19267 | 38.25–50.91 |
| Si | 3.85–j0.02 | 1.4799 | 65.000 | 312.79 | 57.52 | 0.90922 | 57.89–72.50 |
| Si | 3.85–j0.02 | 1.46 | 62.888 | 311.36 | 56.60 | 0.84255 | 55.70–70.30 |
| Si | 3.85–j0.02 | 1.46 | 83.484 | 1002.00 | 53.74 | 3.86667 | 81.15–85.55 |
| Al | 1.5–j7.6 | 2.20 | 62.385 | 160.14 | 95.43 | 0.09417 | 48.90–81.25 |
| Al | 1.5–j7.6 | 1.503 | 45.000 | 219.07 | 93.39 | 0.05688 | 35.53–54.35 |
| ZnS | 2.35 | 1.46 | 73.699 | 638.50 | 47.66 | 1.70587 | 69.30–78.50 |
| $SiO_2$ (glass) | 1.5 | 1.127 | 69.970 | 464.05 | 22.70 | 0.63914 | 61.00–68.51 |

For the glass substrate ($N_s = 1.5$), the calculated low film refractive index, $n_1 = 1.127$, does not correspond to any known thin solid film; but such a refractive index could nevertheless be realized by creating a two-dimensional subwavelength-structured surface on glass, using techniques that are well known in diffractive optics. (See, e.g., *Diffractive Optics: Design, Fabrication, and Applications*, the feature issue of Appl. Opt. vol. 32 (No. 14) (1993).)

Figure 6:
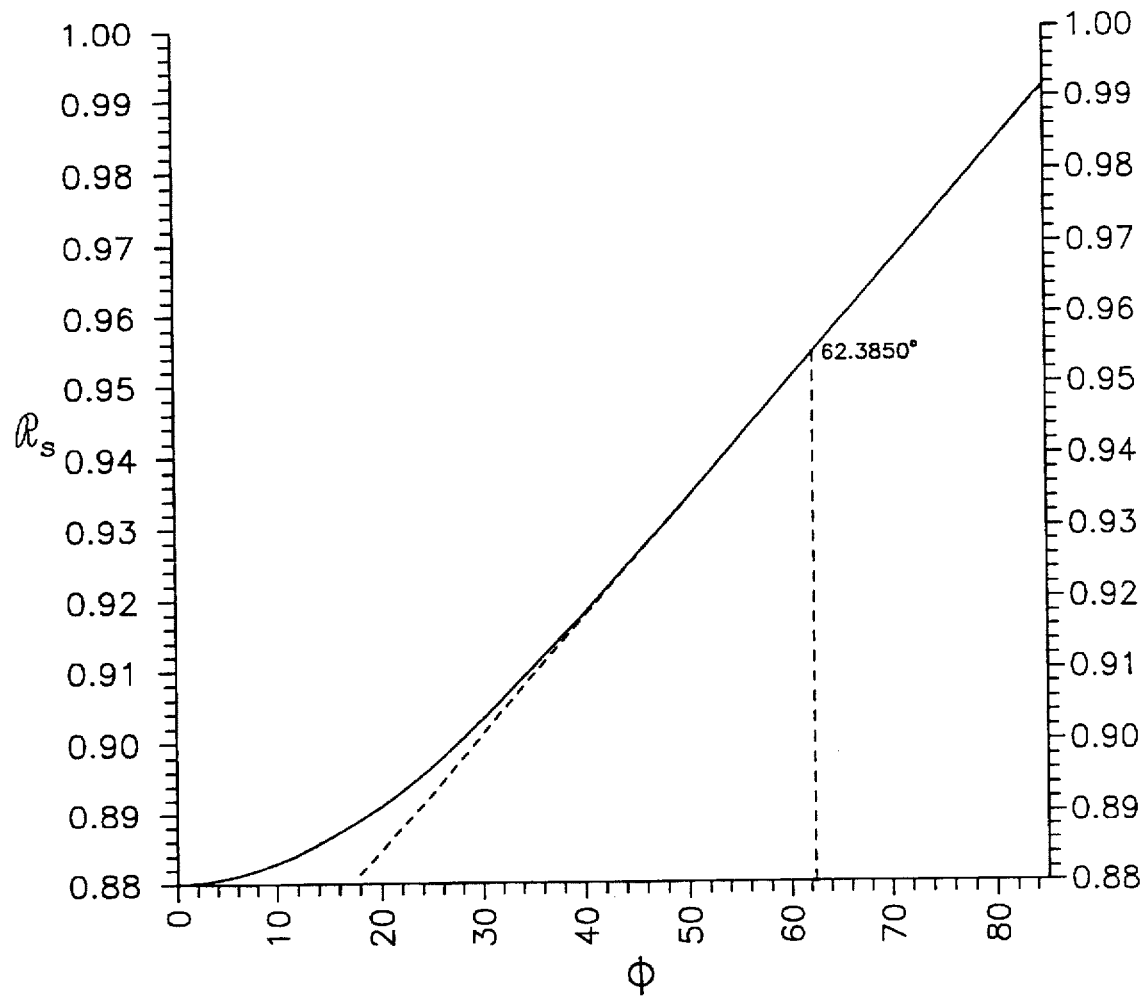
FIG. 6 depicts the linearized reflectance $\mathfrak{R}_s$ of Al for incident s-polarized light of 633-nm wavelength around the angle $\phi_0=62.38°$ using a low-density ZnS film of refractive index 2.20 and thickness 160.1 nm.

Of the results given in Table 1, the broadest LR (48.9°<$\phi$<81.3°) was obtained for an Al substrate coated with a transparent film of refractive index 2.20 (e.g. low-density ZnS) of thickness 160.1 nm. (See, e.g., E. Ritter, "Dielectric film materials for optical applications," vol. 8, pp. 1–49 in *Physics of Thin Films*, G. Hass and M. H. Francombe, Eds. (Academic, New York, 1975).) The linearized response $\mathcal{R}_s(\phi)$, illustrated in FIG. 6, has a slope of 0.16% $deg^{-1}$ at $\phi_0 = 62.385°$. The slope is small because of the high reflectance of Al at normal incidence.

Figure 7:
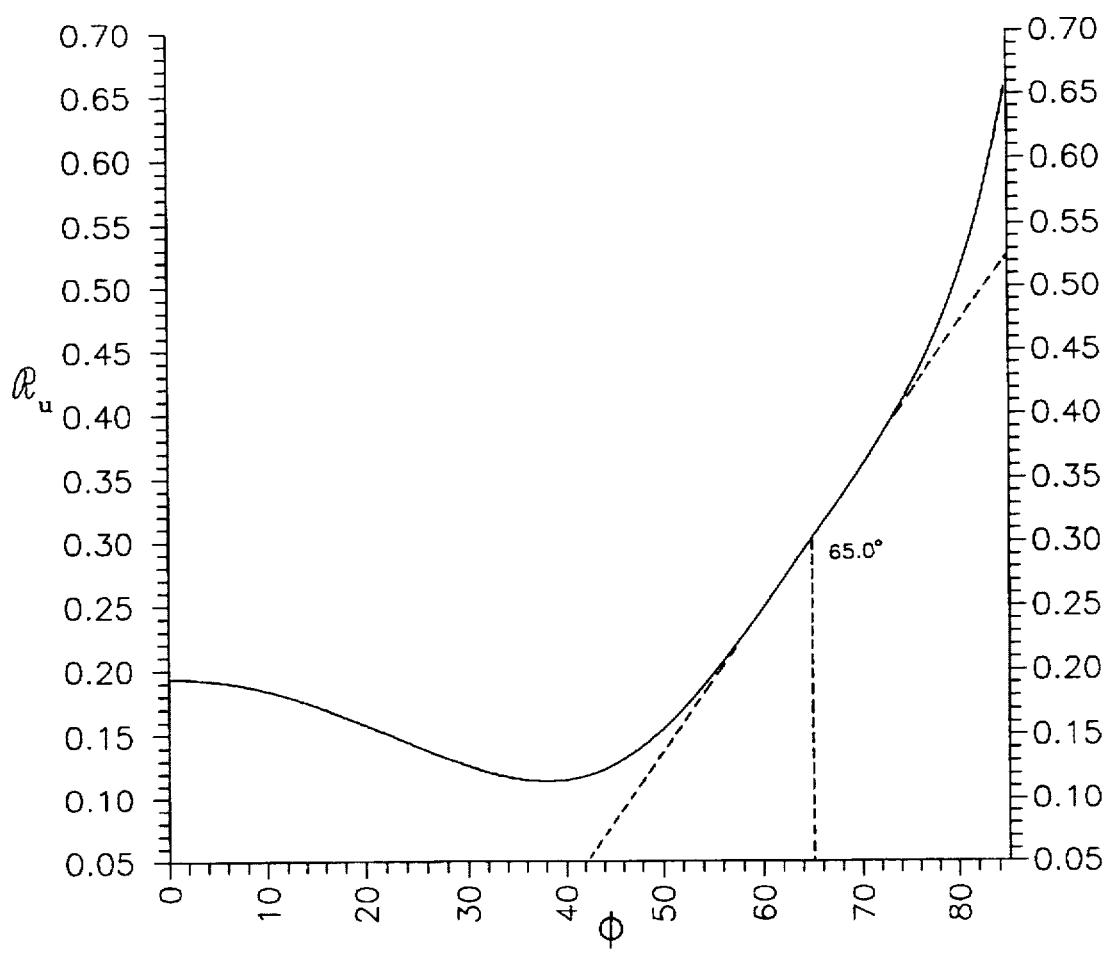
FIG. 7 depicts the linearized reflectance $\mathfrak{R}_u$ of Si for incident unpolarized light of 633-nm wavelength around the angle $\phi_0=65°$ using a $MgF_2$ film of refractive index 1.381 and thickness 384.2 nm.

One example of linearized reflectance for incident unpolarized light $\mathcal{R}_u$ is illustrated in FIG. 7, using a Si substrate at 633-nm wavelength. With $\phi_0=65°$, the required transparent coating has a refractive index $n_1=1.381$ (MgF$_2$) and thickness $d=384.23$ nm. In this case $\mathcal{R}_u(\phi_0)=30.27\%$, the slope $\mathcal{R}_u'(\phi_0)=1.11\%$ deg$^{-1}$, and the LR is from 57.5° to 73.3°.

Figure 14:
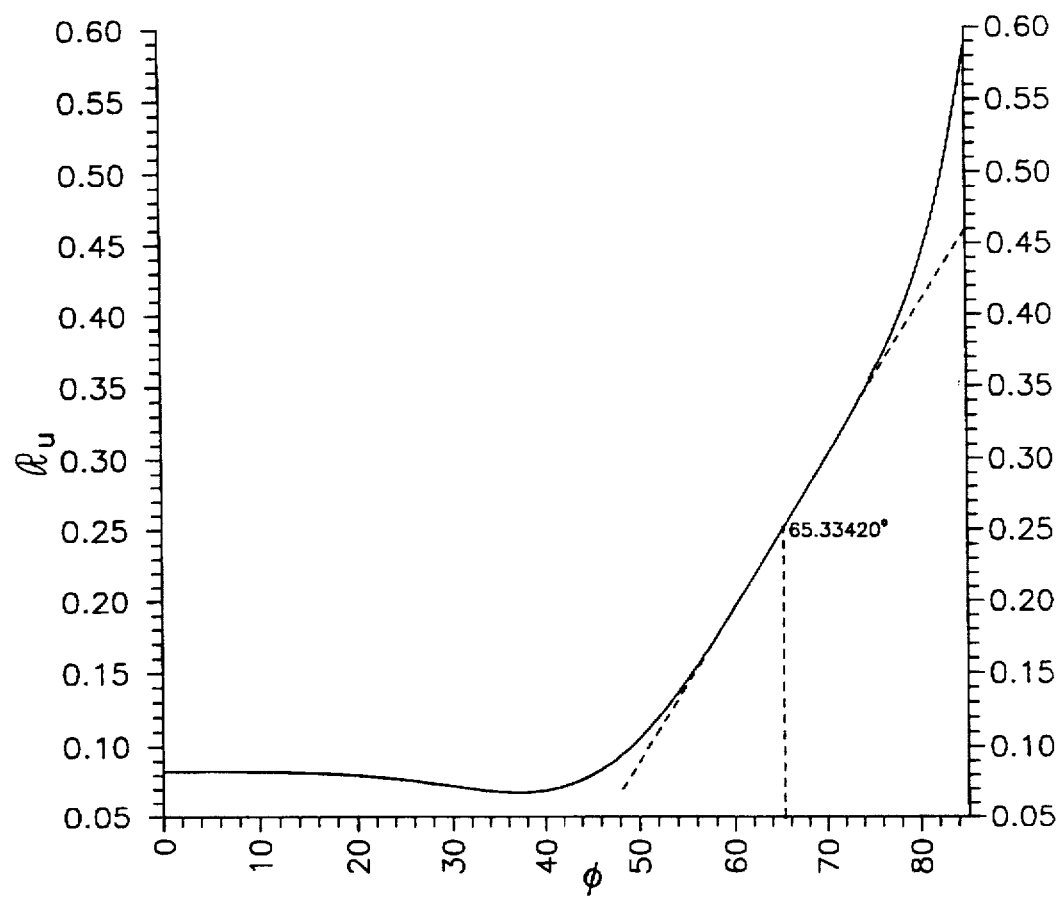
FIG. 14 depicts the linearized reflectance $\mathfrak{R}_u$ of Si for incident unpolarized light of 633-nm wavelength around the angle $\phi_0=65.33°$ using a $SiO_2$ film of refractive index 1.46 and thickness 324.5 nm.

Another example of linearized reflectance for incident unpolarized light $\mathcal{R}_u$ is illustrated in FIG. 14, using a Si substrate at 633-nm wavelength with a transparent coating of refractive index $n_1=1.46$ (SiO$_2$), an operating angle $\phi_0=65.33°$, and film thickness $d=324.5$ nm. In this case $\mathcal{R}_u(\phi_0)=25.13\%$, the slope $\mathcal{R}_u'(\phi_0)=1.06\%$ deg$^{-1}$, and the LR is from 60.00° to 71.10°.

Error Analysis

Figure 8:
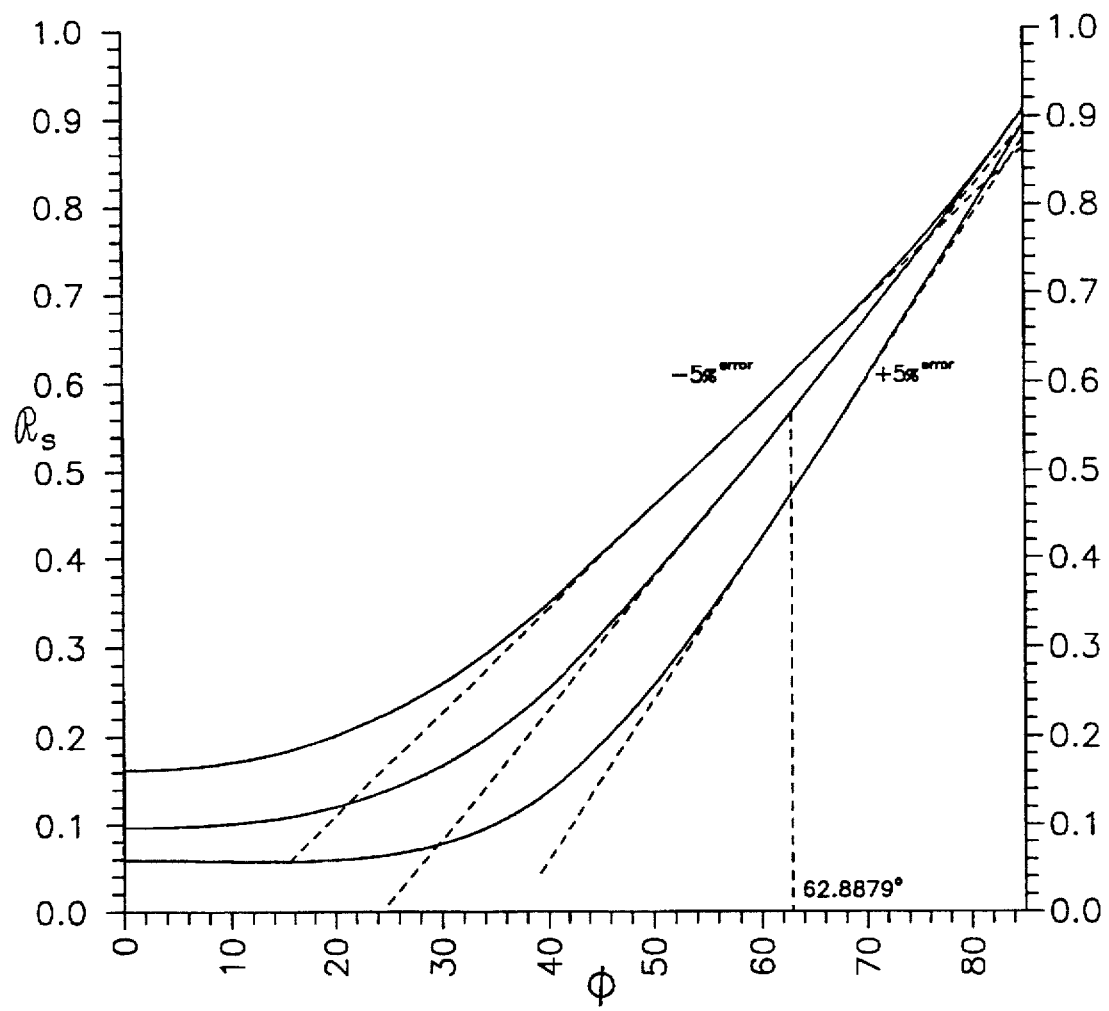
FIG. 8 depicts the effect of a ±5% film refractive index error on the linearized s-reflectance response of a Si substrate coated with a $SiO_2$ film of thickness 311.4 nm at 633-nm wavelength.
Figure 9:
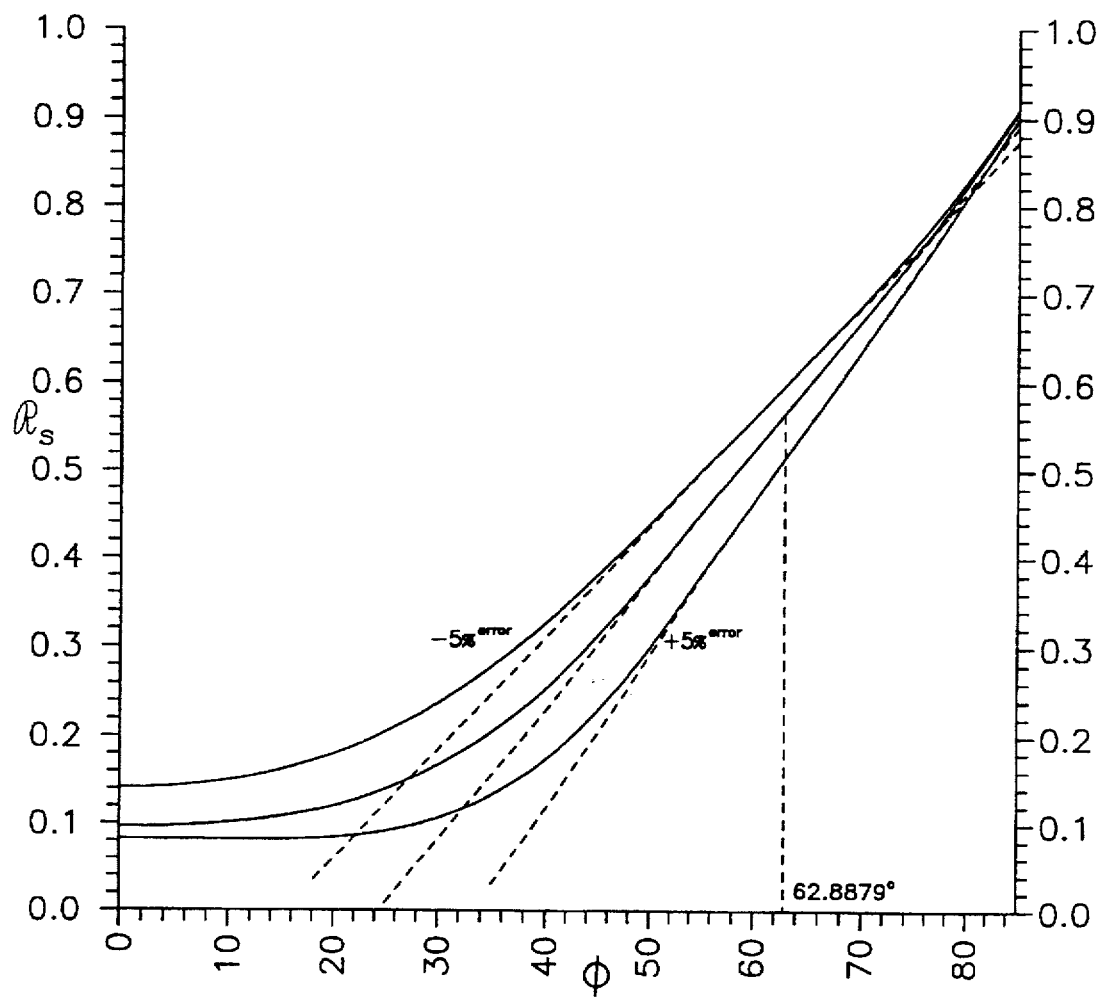
FIG. 9 depicts the effect of a ±5% film thickness error on the linearized s-reflectance response of a Si substrate coated with a $SiO_2$ film of thickness 311.4 nm at 633-nm wavelength.

It was found that the linearized response was robust with respect to small errors (±5%) in the film refractive index or in the film thickness. The starting design in an error analysis was that using a 311.4-nm SiO$_2$ film on Si at 633-nm wavelength. FIG. 8 shows the shifted response caused by refractive index errors, and FIG. 9 shows the shifted response caused by film thickness errors. In both Figures the middle curve is the reflectance of the design curve in the absence of errors. It is evident that although errors in the refractive index and the thickness changed the slope and the LR, reasonably good linearity was nevertheless retained.

Figure 10:
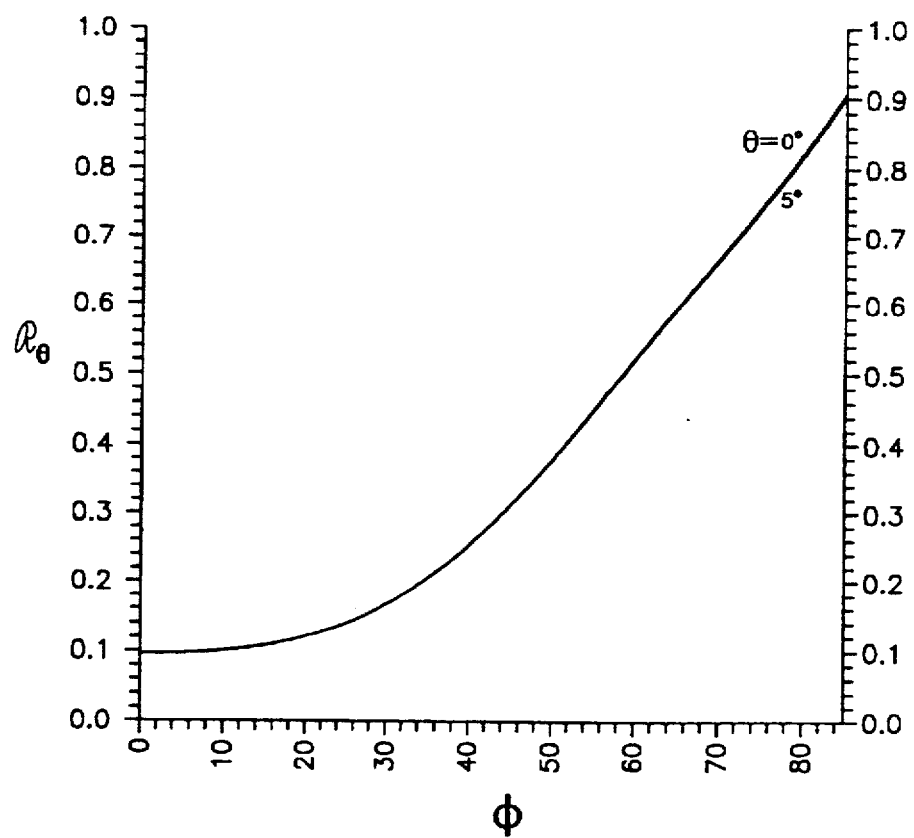
FIG. 10 depicts the effect of a ±5% shift θ of the orientation of the incident electric field vector from the s direction on the linearized reflectance response of a Si substrate coated with a $SiO_2$ film of thickness 311.4 nm at 633-nm wavelength.

FIG. 10 shows the effect on the same 311.4-nm SiO$_2$ film on Si at 633-nm wavelength of changing the direction of linear polarization of incident light by ±5° from that of the normal to the plane of incidence (i.e., the pure s-state). As can be seen, the effect on the linearized $\mathcal{R}_s(\phi)$ response was negligible.

Construction of Prototype Rotation Sensor

Except as noted below, the previous examples are the results of calculations based on Eqs. (2). To demonstrate the soundness of the underlying principles, a working prototype of a linearized reflectance coated surface has been made also, and has been successfully used in a prototype rotation sensor.

The prototype rotation sensor is illustrated in FIG. 11(a). The reflectance response for the coated surface used in the prototype sensor is illustrated in FIG. 11(b). Linearized reflectance sensor element S was mounted on a rotating shaft so that the (vertical) axis of rotation lay in the plane of the sensor surface. Sensor element S comprised a Si surface with a 311-nm SiO$_2$ coating. This coated surface was custom-manufactured by a commercial semiconductor device manufacturer, using standard techniques known in the art. Incident light from a He-Ne laser (633-nm wavelength) was (vertically) polarized perpendicular to the (horizontal) plane of incidence. Lens L in the path of the reflected beam imaged the point of reflection onto linear photodetector D (a silicon photodiode). Narrow-band 633-nm spectral filter F permitted measurements to be taken in ambient light. The revolving reflected light beam was intercepted by lens L, and was focused onto detector D, but only over the range of angles $\phi_0 \pm \beta$, where $\phi_0 \approx 63°$ and $\beta \approx 7°$.

The detected signal as a function of time t is given by $$i(t)=CI_{0s}\mathcal{R}_s, \quad (3)$$

where $I_{0s}$ is the intensity (or power) of incident s-polarized light (assumed to be constant), and C is a constant that is characteristic both of the detector and of losses due to lens L and filter F. The rate of change of the signal is given by $$di/dt=CI_{0s}(d\mathcal{R}_s/d\phi)(d\phi/dt). \quad (4)$$

Because $d\mathcal{R}_s/d\phi$ is approximately constant over the LR, $$di/dt=\omega CI_{0s}\mathcal{R}_s'(\phi_0), \quad (5)$$

where $\omega=d\phi/dt$ is the angular velocity to be measured. If we define $$i_0=CI_{0s}\mathcal{R}_s(\phi_0), \quad (6)$$

then, by division, Eqs. (5) and (6) lead to the following solution for $\omega$:

$$\omega=[(di/dt)/i_0]/[\mathcal{R}_s'(\phi_0)/\mathcal{R}_s(\phi_0)]. \quad (7)$$

Equation (7) gives the basis for measuring the angular speed $\omega$ using the reflection sensor system depicted in FIG. 11(a). The numerator of the right-hand side is determined by analysis of the electrical output pulse of the photodetector for each rotation of the shaft, and the denominator is a characteristic of the reflective sensor element.

Because the system can readily measure $\omega$ once per rotation of the shaft, the angular acceleration α can be easily calculated from data obtained from two successive pulses using the simple relation $$\alpha=d\omega/dt=(\omega_2-\omega_1)/\Delta t, \quad (8)$$

where $\Delta t$ is the time separation of the two consecutive pulses. Note that both rotational velocity and rotational acceleration may be measured at a temporal resolution of one measurement per rotation.

Figure 12:
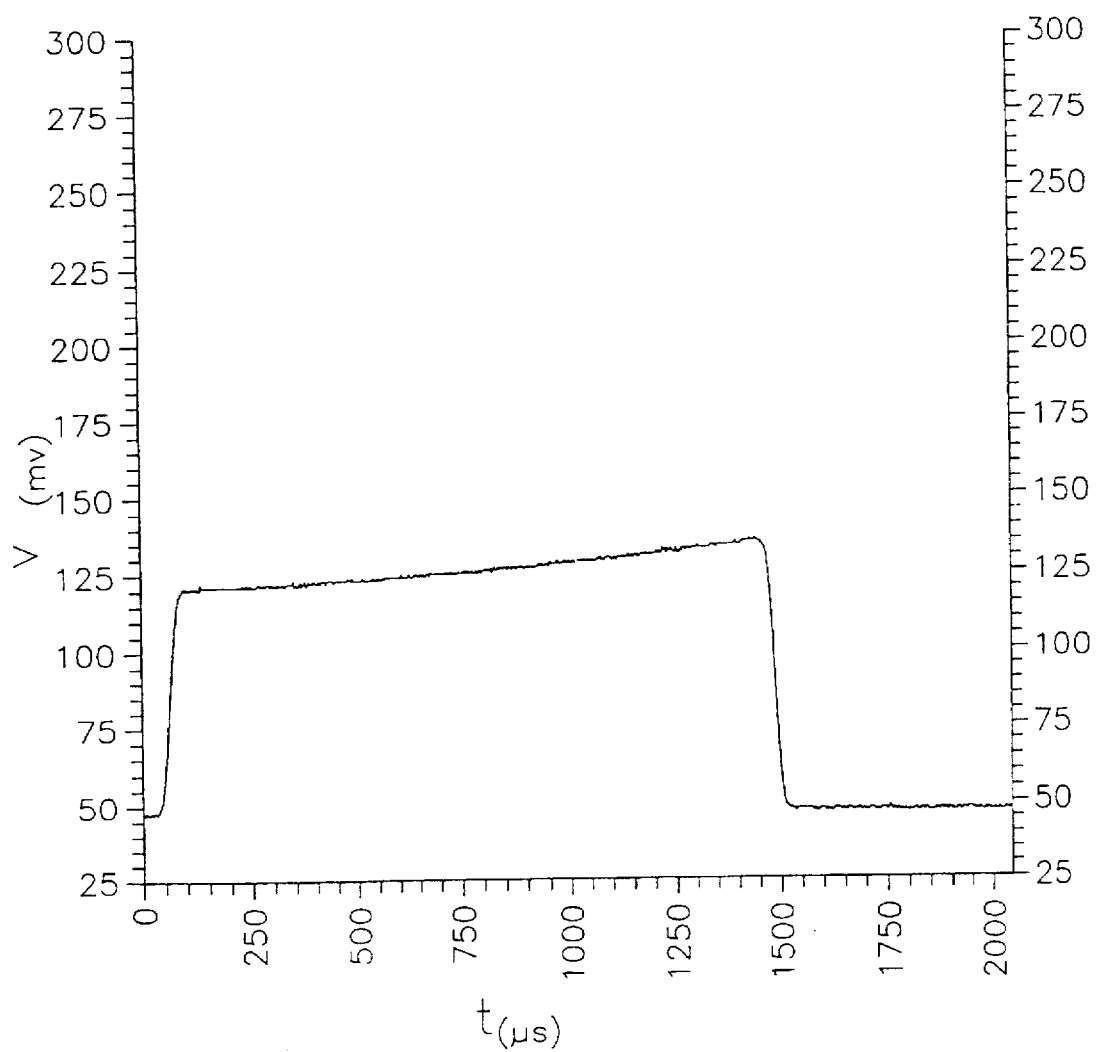
FIG. 12 depicts a typical output pulse from photodiode D of the prototype depicted in FIG. 11(a).
Figure 13:
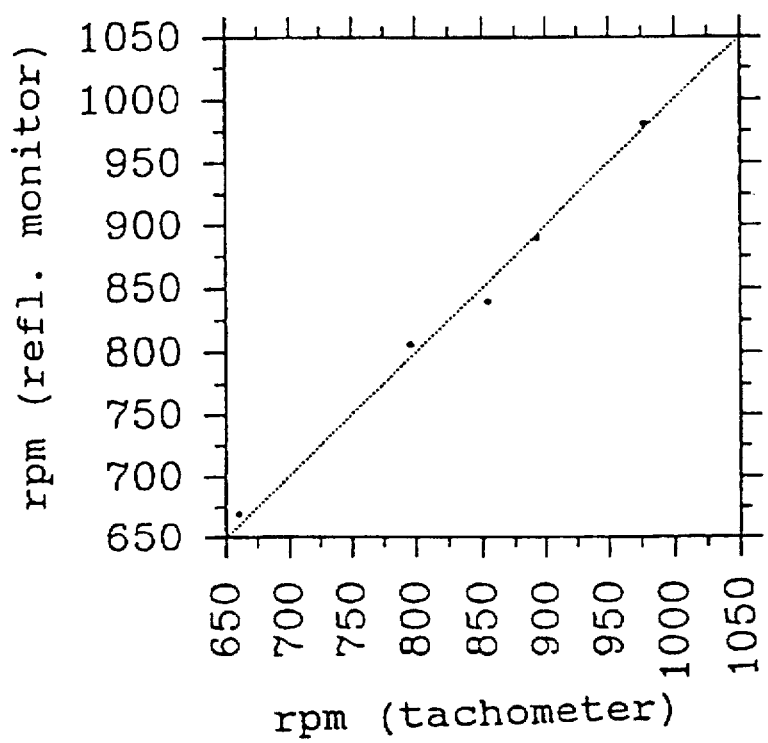
FIG. 13 depicts the correlation of the results obtained with the prototype rotation sensor system of FIG. 11 with measurements from a commercial tachometer.

The apparatus depicted in FIG. 11(a) has been used to measure the rotational speed of a small variable-speed motor. A typical output pulse of photodiode D is shown in FIG. 12, from which a measured speed of 840 rpm was determined through Eq. (7). FIG. 13 illustrates the close correlation between measurements at different speeds as determined by the novel sensor, and rotational velocities as determined by a commercial tachometer. The good agreement (within ±4%) confirms the validity of this simple reflection sensor.

At a sufficiently small scale, any continuous function may be approximated by a linear function. Although it is preferred that the rotation sensor described here be used with a linear-reflectance coating, the sensor would also function with a non-linear reflectance, if the range of incident angles sampled by the photodiode were sufficiently small that the reflectance may be approximated as linear over the range sampled.

General

The thin layers used in practicing this invention may be made through known means. For example, oxidation of silicon to make an SiO$_2$ layer of a desired thickness may be performed with techniques commonly used in the manufacture of silicon semiconductor devices. Thin films of various materials may also be made through the use of methods known in the field of optical coating technology, e.g., deposition by e-beam or thermal evaporation in vacuum, sputtering in vacuum, or ion-assisted deposition. In particular, thin films having refractive indices less than that of the corresponding bulk material can be made with e-beam or thermal deposition, while thin films having greater refractive indices can be made with ion-assisted deposition. The refractive index and the thickness of a film may be verified through means known in the such as using ellipsometry measurements.

By replacing the passive SiO$_2$-Si reflector with an active Si photodiode (coated, in this example, with an oxide layer of the same 311-nm thickness), one can measure the angular speed associated with torsional oscillation or other rotational movement, without the use of reflection optics such as depicted in FIG. 11. In this case the output signal of the shaft-mounted reflective Si photodiode becomes proportional to $(1-\mathfrak{R}_s)$ instead of to $\mathfrak{R}_s$, and the analysis of Eqs. (3)–(7) is modified accordingly. Because of wiring constraints, continuous (unlimited) rotation of the shaft would present difficulties. This alternative configuration would thus be particularly suited for monitoring torsional oscillation. To operate the active sensor in ambient light the input signal beam is interrupted by a chopper, and the output signal of the shaft-mounted detector is measured at the modulation frequency using lock-in signal detection.

As one example of such an embodiment, a windowless silicon photodiode coated with a 311-nm $SiO_2$ film was constructed and mounted on a rotating shaft. The electrical output signal of this photodiode was measured as a function of the angle of incidence $\phi$ of s-polarized monochromatic light of 633-nm wavelength. Linearity within ±1% was confirmed for $\phi$ within the range from 56° to 70°.

Although good results were obtained with a single homogeneous film, it will be apparent to those of skill in the art, given the teachings of the present specification, that multilayer and graded-index films offer additional flexibility that may be used, e.g., to broaden the range of linearity, or to achieve a linear response at more than one wavelength.

The entire disclosures of all references cited in this specification are hereby incorporated by reference in their entirety. Also incorporated by reference in its entirety is the following paper, which is not prior art to the present invention: R. M. A. Azzam et al., "Single-layer-coated surfaces with linearized reflectance versus angle of incidence: application to passive and active silicon rotation sensors," J. Opt. Soc. Am. A, vol. 12, pp. 1790–1796 (1995), a paper that was presented at the annual meeting of the Optical Society of America in Dallas Tex. on Oct. 7, 1994.

Obtaining the Derivatives in Equations (2) from Equations Describing Light Reflection by a Coated Surface.

The complex-amplitude reflection coefficient r of a substrate coated by a single uniform layer may be written in the form:

$$r = N/D = (a+bX)/(1+abX), \quad (9)$$

where a and b are the air/film and film/substrate interface Fresnel reflection coefficients. The Fresnel reflection coefficients depend on the incident light polarization, the angle of incidence, and the refractive indices of the film and substrate. Fresnel coefficients are given in standard textbooks on optics. (See, e.g., R. M. A. Azzam et al., *Ellipsometry and Polarized Light* (North-Holland, Amsterdam, 1987).)

In Eq. (9) X is a complex exponential function of film thickness d:

$$X = \exp[-j4\pi(d/\lambda)(n_1^2 - \sin^2\phi)^{1/2}], \quad (10)$$

where $\lambda$ is the wavelength of light, $n_1$ is the film refractive index, and $\phi$ is the angle of incidence in air.

To linearize reflectance as a function of angle of incidence in the midrange of incident angles, it is sufficient to consider only the first, second, and third derivatives of the reflection coefficients with respect to angle of incidence. For simplicity, the "prime" notation is used to indicate a derivative with respect to $\phi$; e.g., $r' = dr/d\phi$. By successive differentiation of the form r=N/D, the normalized derivatives of the complex reflection coefficients are obtained:

$$r'/r = (N'/N) - (D'/D), \quad (11)$$

$$r''/r = (N''/N) - (D''/D) - 2(N'/N)(D'/D) + 2(D'/D)^2, \quad (12)$$

$$r'''/r = (N'''/N) - (D'''/D) - 3(N''/N)(D'/D) - 3(N'/N)(D''/D) + 6(N'/N)(D'/D)^2 + 6(D'/D)(D''/D) - 6(D'/D)^3. \quad (13)$$

The derivatives of N and D are given by $$N' = a' + b'X + bX', \quad (14)$$

$$N'' = a'' + b''X + 2b'X' + bX'', \quad (15)$$

$$N''' = a''' + b'''X + 3b''X' + 3b'X'' + bX''', \quad (16)$$

$$D' = a'bX + ab'X + abX', \quad (17)$$

$$D'' = a''bX + 2a'b'X + 2a'bX' + 2ab'X' + ab''X + abX'', \quad (18)$$

$$D''' = a'''bX + 3a''b'X + 3a''bX' + 3a'b''X + 3ab'X'' + 3ab'''X' + 3a'bX'' + 6a'b'X' + ab'''X + abX'''. \quad (19)$$

The derivatives of X and of the Fresnel coefficients a and b have been published. See R. M. A. Azzam, "Stationary property of normal-incidence reflection from isotropic surfaces," J. Opt. Soc. Am., vol. 72, pp. 1187–1189 (1982); and R. M. A. Azzam, "Angle-of-incidence derivatives of the complex parallel and perpendicular reflection coefficients and their ratio for a film-substrate system," Optica Acta, vol. 30, pp. 1113–1124 (1983).

The intensity or power reflectance $\mathfrak{R}$ is related to the complex-amplitude reflection coefficient r by the relation $$\mathfrak{R} = rr^*, \quad (20)$$

where r* denotes the complex conjugate of r. Derivatives of intensity reflectance are obtained from the derivatives of r through the following relations:

$$\mathfrak{R}' = 2Re(r'r^*), \quad (21)$$

$$\mathfrak{R}'' = 2|r'|^2 + 2Re(r''r^*), \quad (22)$$

$$\mathfrak{R}''' = 2Re(r'''r^* + 2r''r'^* + r'r''^*), \quad (23)$$

where "Re(z)" denotes the real part of complex quantity z.

Application of the relationships of Eqs. (9) through (23) to solve Eqs. (2) is straightforward. As a check, the analytically-obtained results were independently confirmed using the Macsyma™ algebraic manipulation software package (Macsyma, Inc., Arlington, Mass.).

I claim:

1. A sensor for measuring rotational velocity, comprising:
   (a) a specularly reflective coated surface;
   (b) a source of monochromatic light positionable so that the light reflects from said coated surface;
   (c) means for measuring, as a function of time, the intensity of light reflected from said coated surface over a range of incident angles; and
   (d) means for calculating the rotational velocity of said coated surface as being proportional to the time rate of change of the measured intensity of reflected light within the range of incident angles thereby measured.

2. A sensor as recited in claim 1, wherein said light source comprises a source of unpolarized or s-polarized monochromatic light of wavelength $\lambda$; and wherein said coated surface comprises:
   a substrate and a film coating said substrate; wherein the refractive index of the substrate, the refractive index of the film, and the thickness of the film are such that the second derivative and the third derivative of the reflectance of said coated surface, with respect to the angle of light incidence $\phi$ measured from a direction normal to said coated substrate, are both zero at a particular angle of incidence $\phi=\phi_0$, greater than 30° for unpolarized or s-polarized light of wavelength $\lambda$; whereby the intensity reflectance from said coated surface of unpolarized or s-polarized light at wavelength $\lambda$ is, to within ±1%, a linear function of angle of incidence $\phi$ over a range of angles $\phi_1$ through $\phi_2$ that includes $\phi_0$, wherein the difference between $\phi_1$ and $\phi_2$ is at least 4°.

3. A sensor as recited in claim 2, wherein said substrate comprises silicon, wherein said film comprises silicon dioxide of refractive index 1.46, and wherein said film has a thickness of 311 nm; whereby the reflectance of s-polarized light of wavelength $\lambda$=633 nm from said coated surface is a linear function of the angle of light incidence $\phi$ over a range of $\phi$ from 55.70° to 70.30°.

4. A sensor for measuring torsional velocity, said se comprising:

(a) a photodiode having a specularly reflective coated surface, wherein an electric potential is induced in said photodiode by light incident on the coated surface;

(b) a source of light positionable so that the light reflects from said coated surface;

(c) means for measuring, as a function of time, the electric potential induced in said photodiode by the incident light at a range of incident angles; and (d) means for calculating the rotational velocity of said coated surface as being proportional to the time rate of change of the measured electric potential within the range of incident angles thereby measured.

5. A sensor as recited in claim 4, wherein said light source comprises a source of unpolarized or s-polarized monochromatic light; and wherein said coated surface comprises:

a photosensitive substrate and a film coating said substrate; wherein the refractive index of the substrate, the refractive index of the film, and the thickness of the film are such that the second derivative and the third derivative of the reflectance of said coated surface, with respect to the angle of light incidence $\phi$ measured from a direction normal to said coated substrate, are both zero at a particular angle of incidence $\phi=\phi_0$ greater than 30° for unpolarized or s-polarized light for a particular wavelength $\lambda$; whereby the intensity reflectance from said coated surface of unpolarized or s-polarized light at wavelength $\lambda$ is, to within ±1%, a linear function of angle of incidence $\phi$ over a range of angles $\phi_1$ through $\phi_2$ that includes $\phi_0$, wherein the difference between $\phi_1$ and $\phi_2$ is at least 4°.

6. A sensor as recited in claim 5, wherein said photodiode comprises a silicon photodiode forming said substrate, wherein said film comprises silicon dioxide of refractive index 1.46, and wherein said film has a thickness of 311 nm; whereby the electric potential induced in said photodiode by s-polarized light of wavelength $\lambda$=633 nm is a linear function of the angle of light incidence $\phi$ over a range of $\phi$ from 55.70° to 70.30°.

7. A coated surface that will reflect incident light; said coated surface comprising a substrate and a film coating said substrate; wherein the refractive index of the substrate, the refractive index of the film, and the thickness of the film are such that the second derivative and the third derivative of the reflectance of said coated surface, with respect to the angle of light incidence $\phi$ measured versus a direction normal to said coated substrate, are both zero at a particular angle of incidence $\phi=\phi_0$ greater than 30° for a particular wavelength $\lambda$ of incident unpolarized, s-polarized, or p-polarized light; whereby the intensity reflectance of incident unpolarized, s-polarized, or p.-polarized light at wavelength $\lambda$ is, to within ±1%, a linear function of angle of incidence $\phi$ over a range of angles $\phi_1$ through $\phi_2$ that includes $\phi_0$, wherein the difference between $\phi_1$ and $\phi_2$ is at least 4°.

8. A coated surface as recited in claim 7, wherein said coated surface is flat.

9. A coated surface as recited in claim 7, wherein the refractive index of the substrate, the refractive index of the film, and the thickness of the film are such that the second derivative and the third derivative of the reflectance of said coated surface, with respect to the angle of light incidence $\phi$ measured from a direction normal to said coated substrate, are both zero at a particular angle of incidence $\phi=\phi_0$ greater than 30° for a particular wavelength $\lambda$ of incident unpolarized or s-polarized light; whereby the intensity reflectance of incident unpolarized or s-polarized light at wavelength $\lambda$ is, to within ±1%, a linear function of angle of incidence $\phi$ over a range of angles $\phi_1$ through $\phi_2$ that includes $\phi_0$, wherein the difference between $\phi_1$ and $\phi_2$ is at least 4°.

10. A coated surface as recited in claim 9, wherein said substrate comprises silicon, wherein said film comprises silicon dioxide of refractive index 1.46, and wherein said film has a thickness of 311 nm; whereby the reflectance of s-polarized light of wavelength $\lambda$=633 nm from said coated surface is a linear function of the angle of light incidence $\phi$ over a range of $\phi$ from 55.70° to 70.30°.

11. A coated surface as recited in claim 9, wherein said substrate comprises silicon, wherein said film comprises dense magnesium fluoride of refractive index 1.394, and wherein said film has a thickness of 235 nm; whereby the reflectance of s-polarized light of wavelength $\lambda$=633 nm from said coated surface is a linear function of the angle of light incidence $\phi$ over a range of $\phi$ from 38.25° to 50.91°.

12. A coated surface as recited in claim 9, wherein said substrate comprises silicon, wherein said film comprises dense silicon dioxide of refractive index 1.48, and wherein said film has a thickness of 313 nm; whereby the reflectance of s-polarized light of wavelength $\lambda$=633 nm from said coated surface is a linear function of the angle of light incidence $\phi$ over a range of $\phi$ from 57.89° to72.50°.

13. A coated surface as recited in claim 9, wherein said substrate comprises silicon, wherein said film comprises silicon dioxide of refractive index 1.46, and wherein said film has a thickness of 1002 nm; whereby the reflectance of s-polarized light of wavelength $\lambda$=633 nm from said coated surface is a linear function of the angle of light incidence $\phi$ over a range of $\phi$ from 81.15° to 85.55°.

14. A coated surface as recited in claim 9, wherein substrate comprises aluminum, wherein said film comprises low-density zinc sulfide of refractive index 2.20, and wherein said film has a thickness of 160 nm; whereby the reflectance of s-polarized light of wavelength $\lambda$=633 nm from said coated surface is a linear function of the angle of light incidence $\phi$ over a range of $\phi$ from 48.90° to 81.25°.

15. A coated surface as recited in claim 9, wherein said substrate comprises aluminum, wherein said film comprises low-density aluminum oxide of refractive index 1.503, and wherein said film has a thickness of 219 nm; whereby the reflectance of s-polarized light of wavelength $\lambda$=633 nm from said coated surface is a linear function of the angle of light incidence $\phi$ over a range of $\phi$ from 35.53° to 54.35°.

16. A coated surface as recited in claim 9, wherein said substrate comprises polycrystalline zinc sulfide, wherein said film comprises silicon dioxide of refractive index 1.46, and wherein said film has a thickness of 638 nm; whereby the reflectance of s-polarized light of wavelength $\lambda$=633 nm from said coated surface is a linear function of the angle of light incidence φ over a range of φ from 69.30° to 78.50°.

17. A coated surface as recited in claim 9, wherein said substrate comprises silicon dioxide glass, wherein said film comprises a two-dimensional subwavelength-structured surface on glass of refractive index 1.127, and wherein said film has a thickness of 464 nm; whereby the reflectance of s-polarized light of wavelength λ=633 nm from said coated surface is a linear function of the angle of light incidence φ over a range of φ from 61.00° to 68.51°.

18. A coated surface as recited in claim 9, wherein said substrate comprises silicon, wherein said film comprises magnesium fluoride of refractive index 1.381, and wherein said film has a thickness of 384 nm; whereby the reflectance of unpolarized light of wavelength λ=633 nm from said coated surface is a linear function of the angle of light incidence φ over a range of φ from 57.5° to 73.3°.

19. A coated surface as recited in claim 9, wherein said substrate comprises silicon, wherein said film comprises silicon dioxide of refractive index 1.46, and wherein said film has a thickness of 324 nm; whereby the reflectance of unpolarized light of wavelength λ=633 nm from said coated surface is a linear function of the angle of light incidence φ over a range of φ from 60.0° to 71.1°.

20. A photodiode in which an electric potential is induced by incident light, said photodiode comprising a coated surface as recited in claim 9, wherein said substrate comprises a photosensitive substrate.

21. A photodiode as recited in claim 20, wherein said photosensitive substrate comprises a silicon photodiode, and wherein said film comprises silicon dioxide of refractive index 1.46, and wherein said film has a thickness of 311 nm; whereby the electric potential induced in said photodiode by s-polarized light of wavelength λ=633 nm is a linear function of the angle of light incidence φ over a range of φ from 55.70° to 70.30°.

* * * * *